(12) United States Patent
Cornwall (10) Patent No.: US 9,441,987 B2
(45) Date of Patent: Sep. 13, 2016

(54) ALARMING BASED ON RESOURCE CONSUMPTION DATA

(75) Inventor: Mark K. Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 714 days.

(21) Appl. No.: 13/243,975

(22) Filed: Sep. 23, 2011

(65) Prior Publication Data

US 2012/0326884 A1 Dec. 27, 2012

Related U.S. Application Data (63) Continuation of application No. 13/168,436, filed on Jun. 24, 2011.

(51) Int. Cl.
*G01D 4/00* (2006.01)

(52) U.S. Cl.
CPC .............. *G01D 4/002* (2013.01); *G01D 4/004* (2013.01); *H04Q 2209/60* (2013.01); *Y02B 90/241* (2013.01); *Y02B 90/242* (2013.01); *Y02B 90/245* (2013.01); *Y04S 20/32* (2013.01); *Y04S 20/36* (2013.01); *Y04S 20/40* (2013.01)

(58) Field of Classification Search
CPC ...... G01D 4/004; H04Q 9/00; G05D 7/0635; G01M 3/26
USPC .......................... 340/870.02; 700/282; 73/40
See application file for complete search history.

(56) References Cited

U.S. PATENT DOCUMENTS

| | | | |
|---|---|---|---|
| 5,559,894 A | 9/1996 | Lubliner et al. | |
| 7,088,239 B2 | 8/2006 | Basinger et al. | |
| 7,412,876 B2 | 8/2008 | Kates | |
| 7,533,703 B2 | 5/2009 | Shuey | |
| 7,920,983 B1* | 4/2011 | Peleg et al. | 340/870.02 |
| 7,939,804 B2 | 5/2011 | Schmidt | |
| 8,347,306 B2* | 1/2013 | Li et al. | 718/104 |
| 8,618,941 B2* | 12/2013 | Javey et al. | 340/605 |
| 2002/0143478 A1 | 10/2002 | Vanderah et al. | |
| 2004/0225648 A1 | 11/2004 | Ransom et al. | |
| 2005/0066026 A1 | 3/2005 | Chen et al. | |
| 2005/0195078 A1* | 9/2005 | Basinger | G01D 4/004 340/521 |
| 2005/0279169 A1* | 12/2005 | Lander | G01M 3/243 73/592 |

(Continued)

FOREIGN PATENT DOCUMENTS

| | | |
|---|---|---|
| EP | 2221589 | 8/2010 |
| WO | WO2007030826 | 3/2007 |

OTHER PUBLICATIONS

The Canadian Office Action mailed Sep. 24, 2012 for Canadian patent application No. 2,755,457, a counterpart foreign application of U.S. Appl. No. 13/168,436, 3 pages.

(Continued)

*Primary Examiner* — Mohamed Barakat
(74) *Attorney, Agent, or Firm* — Lee & Hayes, PLLC (57) ABSTRACT

Consumption data of utility resources such as gas and water may be used to detect conditions that, left unchecked, may lead to a natural gas explosion, flood, or other event. A data collection device may be configured to monitor consumption of a resource through a utility meter at a location in substantially real time. The data collection device may detect abnormal consumption of the resource at the location, and transmit an alert indicating the abnormal consumption of the resource to a remote computing device. The data collection device may additionally initiate a mitigating action to prevent an event based on the abnormal resource consumption.

15 Claims, 6 Drawing Sheets

(56) References Cited

U.S. PATENT DOCUMENTS

| | | | |
|---|---|---|---|
| 2007/0089841 A1 | 4/2007 | Rossato et al. | |
| 2007/0103335 A1* | 5/2007 | Fitzgerald et al. | 340/870.02 |
| 2009/0045976 A1* | 2/2009 | Zoldi et al. | 340/870.02 |
| 2010/0204839 A1* | 8/2010 | Behm et al. | 700/282 |
| 2010/0289652 A1 | 11/2010 | Javey et al. | |
| 2010/0299457 A1 | 11/2010 | Johnson | |
| 2011/0004353 A1 | 1/2011 | Yokohata et al. | |
| 2011/0074601 A1 | 3/2011 | Cornwall | |
| 2012/0026004 A1 | 2/2012 | Broniak et al. | |

OTHER PUBLICATIONS

The PCT Search Report mailed Oct. 31, 2012 for PCT application No. PCT/US12/22974, 9 pages.

U.S. Appl. No. 13/168,436, filed Jun. 24, 2011, Mark K. Cornwall, Matthew Johnson, "Forensic Analysis of Resource Consumption Data," 40 pages.

The Canadian Office Action mailed Mar. 29, 2012 for Canadian patent application No. 2,755,457, a counterpart foreign application of U.S. Appl. No. 13/168,436, 3 pages.

Office action for U.S. Appl. No. 13/168,436, mailed on Apr. 29, 2014, Cornwall et al., "Forensic Analysis of Resource Consumption Data", 13 pages.

The Extended European Search Report mailed Dec. 8, 2014 for European patent application No. 12802427.0, 6 pages.

Final Office Action for U.S. Appl. No. 13/168,436, mailed on Dec. 17, 2014, Mark K. Cornwall, "Forensic Analysis of Resource Consumption Data", 7 pages.

Office Action for U.S. Appl. No. 13/168,436, mailed on Sep. 17, 2014, Mark K. Cornwall, "Forensic Analysis of Resource Consumption Data", 9 pages.

Office Action for U.S. Appl. No. 13/168,436, mailed on Jun. 19, 2015, Mark K. Cornwall, "Forensic Analysis of Resource Consumption Data," 16 pages.

* cited by examiner

ALARMING BASED ON RESOURCE CONSUMPTION DATA

This application is a continuation of U.S. patent application Ser. No. 13/168,436, filed Jun. 24, 2011, and entitled "Forensic Analysis of Resource Consumption Data," which is incorporated herein by reference.

BACKGROUND

Utility companies ("Utilities") have been providing resources, such as natural gas and water directly to customers for years. Gas and/or water lines provide a convenient supply of the respective resource directly to customers' homes, businesses, and other premises. The customer's consumption of the resource is measured using a meter. The meter is typically disposed at a point where the respective gas or water line enters the customer's premises. In rare instances, gas and water lines have been known to leak. In those instances, the leaking resource may cause an event, such as an explosion or fire (in the case of natural gas), or flooding or water damage (in the case of water). Such events may damage the customer's premises and surrounding property. When such events occur, the customer is typically liable for any leaks on the customer's side of the meter, while the utility is typically liable for leaks occurring on the utility's side of the meter. If the leak was caused by malicious action on the customer's side of the meter, criminal charges may also apply.

In the past, there was often no reliable way of determining on which side of the meter a leak occurred. Often the event itself (especially in the case of an explosion or fire) damaged the resource line and/or the meter, making it even more difficult to determine when, where, and why the leak occurred. Also, resource consumption data was not available in a form conducive to determining when or where the leak occurred.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

While natural gas and water leaks are rare, they do occur from time to time. Occasionally, these leaks are due to failure of the lines on the utility's side of the meter. More often, however, leaks are due to damage (accidental or malicious) on the customer's side of the meter. As noted above, a determination of liability for damage from an explosion, fire, flood, water damage, or other event caused by a leak depends largely on the side of the meter upon which the leak occurred. Thus, there is a need for utilities to be able to reliably determine circumstances surrounding such events.

This application describes techniques for forensically analyzing resource consumption data to determine when, where (on which side of the meter), and/or why a leak occurred. Increasingly, utility meters are equipped with data collection devices (coupled to or integrated with the meter) designed to collect, store, and report resource consumption data. These data collection devices are capable of collecting, storing, and reporting not only a running total of resource consumption data (as was the case with traditional utility meters), but also a record of resource consumption over time for a predetermined number of days. This data collection process is often referred to as "data logging." For example, some data collection devices are able to collect hourly consumption data for a period of forty days. When an event occurs, a utility or other user may interrogate the data collection devices to view resource consumption data spanning the event. As used herein, resource consumption data will be said to "span" the event if it includes data leading up to the event, data during the event, and/or data immediately following the event. Thus, the resource consumption data need not necessarily include both data before and after the event in order to "span" the event. This resource consumption data may provide clues as to what caused the event.

For example, if the resource consumption data showed a pattern of normal natural gas resource consumption over a period of days, followed by a period of abnormal (e.g., wide open) gas flow through the meter over a time leading up to or during an explosion or fire, this would provide compelling evidence that the leak occurred on the customer's side of the meter. The consumption data may also provide authorities with information about when the leak started, whether it began as a slow leak and increased (e.g., a cracked or corroded fitting) or was a dramatic increase (e.g., a cut gas line), whether a sufficient amount of the resource was released to cause the event, or other data relevant to an investigation.

In one example, resource consumption data for a time spanning an event may be obtained by interrogating a data collection device, such as an encoder/receiver/transmitter (ERT) coupled to or integrated with a natural gas, water, or other utility meter. Specifically, a computing device may be used to read data logging data from the data collection device by sending an interrogation command to the data collection device and receiving in response a record of resource (e.g., natural gas or water) consumption data over a time spanning the event. The computing device (or another computing device) may then analyze the data logging data including the data spanning the time of the event to determine, among other things, whether a utility providing the resource was responsible for the event.

This application describes example embodiments of natural gas and water supplied by a utility. However, the techniques described herein are also applicable to provision of other resources, such as, for example, propane, kerosene, heating oil, and other petroleum products, electricity, or any other resource. Similarly, while the application gives examples of events including explosion, fire, flood, and water damage, the techniques described herein may also apply to other types of events, such as, for example, asphyxiation, hazardous material contamination, electrical shock, or any other event causing injury or damage to personal or real property.

In addition to the forensic analysis of data logging data subsequent to an event, this application also describes detecting abnormal periods of resource consumption and proactively notifying the utility and/or taking preventive action before occurrence of an event.

Multiple and varied example implementations and embodiments are described below. However, these examples are merely illustrative, and other implementations and embodiments may be used to forensically analyze resource consumption data without departing from the scope of the claims.

Example Non-Networked Environment

Figure 1:
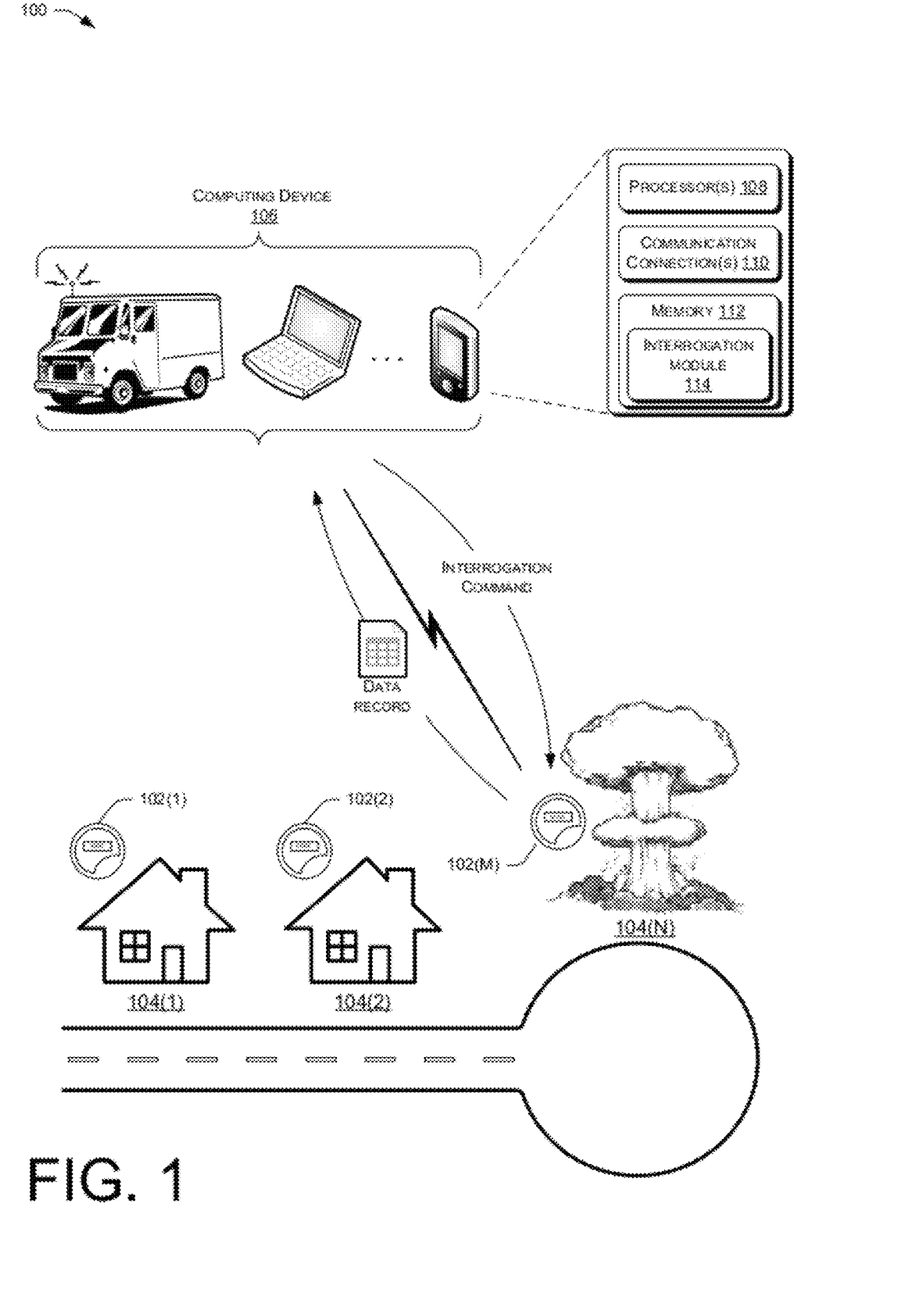
FIG. 1 is a schematic diagram of an example of a non-networked environment in which forensic analysis of resource consumption may be employed to determine when, where (on which side of a utility meter), and/or why an event, such as a natural gas explosion occurred. This analysis may then be used to determine whether a utility supplying the resource is responsible for the event.

FIG. 1 is a schematic diagram of an example of a non-networked environment 100 in which forensic analysis of resource consumption may be employed to determine when, where (on which side of a utility meter), and/or why an event, such as a natural gas explosion occurred. The environment of FIG. 1 is non-networked in the sense that data collection devices 102, and the utility meters with which they are coupled or integrated, are not part of a fixed communication network. Rather, in this non-networked environment 100 resource consumption data is read by portable meter reading devices on a periodic (e.g., monthly) basis.

As shown in FIG. 1, the non-networked environment 100 includes a plurality of homes, stores, or other locations 104(1), 104(2), . . . 104(N) (collectively referred to as 104), each equipped with one or more data collection devices 102(1), 102(2), . . . 102(M) (collectively referred to as 102) usable to collect, store, and report consumption of one or more resources at the respective location. In this example, the number M of data collection devices 102 corresponds to the number N of locations 104. However, in other examples, the numbers M and N may differ if, for example, locations include multiple data collection devices and/or do not include any data collection devices. As shown in this example, location 104(N) has experienced an event—in this case a natural gas explosion. As noted above, it may be difficult or impossible from an examination of the location 104(N) to determine the circumstances leading up to the event. This is particularly true in the case of an explosion or fire, since the gas line may have been damaged by the event itself. However, the resource consumption data leading up to the event may be very informative about the circumstances leading up to the event.

Accordingly, assuming the data collection device 102(M) survives the explosion or other event, the utility providing the resource, law enforcement officials, a supplier of the data collection device 102(M), or another party may interrogate the data collection device 102(M) to obtain the resource consumption data leading up to and spanning the event. In some examples, data collection devices 102 may be designed with high strength, temperature resistant, and/or water proof housings in order to increase the chances that they will survive natural gas explosions, fires, floods, water damage, or other events.

Referring back to FIG. 1, a computing device 106 may be used to interrogate the data collection device 102(M). The computing device 106 may be the same portable meter reading device used to periodically read the utility meters. In FIG. 1, the computing device 106 is illustrated as a vehicle-mounted computing device, a laptop computer, or a mobile device (e.g., a personal digital assistant (PDA), mobile telephone, smartphone, specialized handheld meter reading device, or the like). However, in other embodiments, the computing device 106 may comprise any other computing device capable of interrogating a data collection device 102. Other examples of computing devices that may be used to interrogate data collection devices include, without limitation, servers, data centers, notebooks, netbooks, tablet computing devices, pad-type computing devices, and in-home devices (e.g., energy usage devices). It is worth noting that the interrogation of the data collection device 102 may be performed in the field, as illustrated in FIG. 1, or the data collection device 102 may be removed from the field and taken to a lab or other facility for interrogation.

As shown in the example of FIG. 1, the computing device 106 includes one or more processors 108, communication connections 110, and memory 112. The communication connection(s) 110 allow the computing device 106 to communicate with the data collection devices 102 using wired and/or wireless network communication protocols. The communication connection(s) 110 may include, for example, wide area, local area, home area, and/or personal area network connections. For example, the communication connection(s) 110 may include cellular network connection components, WiFi network connection components, Ethernet network connection components, Zigbee® network connection components, other radio frequency communication components, or the like. The communication connection(s) may facilitate communications using any conventional or proprietary communication protocols.

The memory 112 stores one or more applications, which are executable on the one or more processors 108. The application(s) may include, among other things, an interrogation module 114 usable to interrogate the data collection devices 102. In the event that the computing device 106 is a portable meter reading device, the memory may also include route information, standard consumption messages, scheduling information (e.g., move-in/move-out data), commands for transmission to one or more meters and/or data collection devices, and the like.

As shown in FIG. 1, the interrogation module 114 of the computing device 106 may send an interrogation command to the data collection device 102(M), requesting a record of resource consumption data for a period prior to, at the time of, and/or after an event. The interrogation request may be for resource consumption data for a predetermined number of days (e.g., forty), or may specify a range of days (e.g., last ten days, or a specific range of dates) for which resource consumption data is requested. In response to the interrogation request, the data collection device 102(M) provides the requested data record to the computing device 106 for analysis. In some instances, the data record may be encrypted, in which case the interrogation module 114 or another module or application of the computing device 106 includes (or has access to) a decryption module including any algorithms, keys, or credentials needed to decrypt the data record.

The computing device 106 is able to analyze the data logging data and compare resource consumption values during a first period of normal usage to consumption values during a second period of abnormal usage leading up to the event. Based on this analysis, the computing device 106 is able to determine whether the utility providing the resource was responsible for the event, and/or whether the resource consumption during the second period leading up to the event was sufficient to have caused the event. For any given event, the utility, the customer, and/or a third party may be responsible in whole or in part for the event. As used herein the term "responsible" may, but does not necessarily, mean legal responsibility or liability. Rather, a utility may be "responsible" in the sense that it was responsible for maintaining or administering a portion of a pipeline or other utility infrastructure that caused an event, even though the utility is not ultimately legally responsible or liable for the event, such as in the case where someone tampered with the pipeline or other utility infrastructure.

Example Networked Environment

Figure 2:
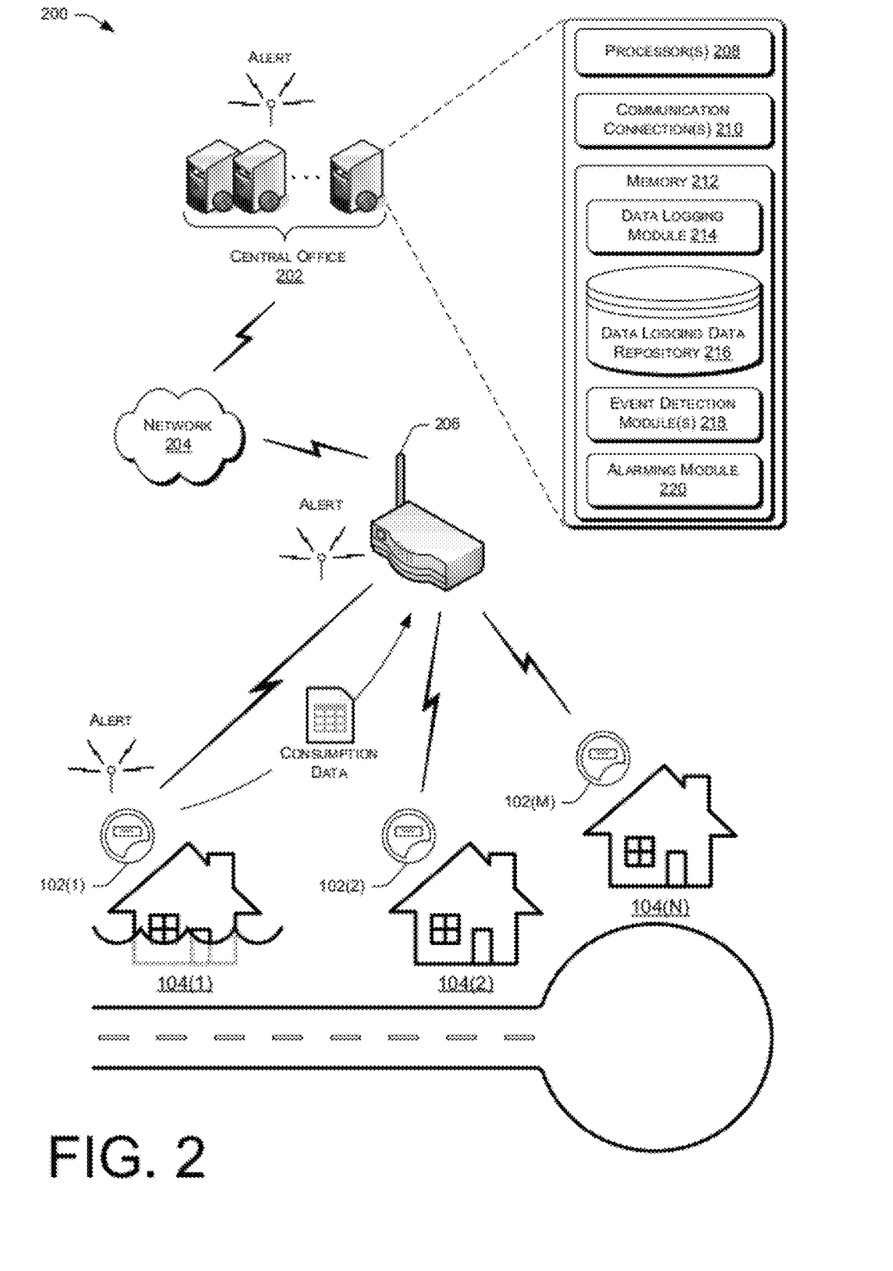
FIG. 2 is a schematic diagram of an example networked environment in which forensic analysis of resource consumption may be employed to determine when, where (on which side of a utility meter), and/or why an event, such as a water leak occurred. Again, this analysis may then be used to determine whether a utility supplying the resource is responsible for the event.

FIG. 2 is a schematic diagram of an example networked environment 200. The environment 200 of FIG. 2 is networked in the sense that data collection devices 102, and the utility meters with which they are coupled or integrated, are in communication with a central office 202 of the utility via a fixed communication network 204. In this networked environment 200, resource consumption data may be transmitted by the data collection devices 102 to the central office 202 over the network 204 periodically, on a substantially continuous basis, and/or upon request. The networked environment of FIG. 2 may be used to implement forensic analysis of resource consumption after the occurrence of an event to determine when, where (on which side of a utility meter), and/or why the event occurred. Additionally or alternatively, the networked environment 200 may be used proactively to generate an alarm or warning prior to occurrence of an event.

In the illustrated example, the data collection devices 102 provide resource consumption data to a network computing device 206, which relays the resource consumption data to the central office 202 via the network 204. In one specific example, the network computing device 206 comprises a network router, sometimes referred to as a "smart grid router," disposed at a cellular relay station (e.g., atop a utility pole). However, in other examples, the network computing device 206 may be implemented as any one of a variety of conventional computing devices such as, for example, a smart utility meter (e.g., electric, gas, and/or water meters equipped with two-way communications), a sensor (e.g., temperature sensors, weather stations, frequency sensors, etc.), a control device, a regulator, a router, a server, a relay, a switch, a valve, or a combination thereof. In still other examples, the network computing device 206 may be omitted and the data collection devices 102 may transmit the resource consumption data to the central office via the network 204.

In the example of FIG. 2, the data collection device 102(1) sends data logging data to the network computing device 206. This data logging data is generally in the form of a network interval message (NIM) or interval data message (IDM) and is transmitted or "bubbled up" periodically at predetermined intervals (e.g., every 15 seconds, 30 seconds, 60 seconds, 5 minutes, 1 hour, etc.). Additionally or alternatively, data collection device 102(1) may transmit the NIM/IDM continuously upon every collection of data and/or upon request of the central office 202 or the network computing device 206. Also, in other examples, the data collection device 102(1) may transmit the consumption data in other formats, such as a record of consumption data over a period of time (e.g., minute-by-minute consumption data over an hour, or hourly consumption data over a period of one or more days).

The network computing device 206 then relays this resource consumption data regardless of form (e.g., NIM/IDM, record of consumption data over time, etc.) to the central office 202 for processing, storage, and/or analysis. The network computing device 206 may relay the resource consumption data immediately upon receipt, or may aggregate resource consumption data from the data collection device 102(1) and/or other data collection devices 102 before sending the aggregated resource consumption data to the central office 202.

The central office 202 in this example includes, among other things, one or more servers arranged in, for example, a cluster or as a server farm. Other server architectures may also be used to implement the central office 202. The server(s) of the central office 202 further include one or more processors 208, communication connections 210, and memory 212. The communication connection(s) 210 allow the central office 202 to communicate with the data collection devices 102 (directly or via the network computing device 206) using wired and/or wireless network communication protocols. The communication connection(s) 210 may include, for example, wide area, local area, home area, and/or personal area network connections. For example, the communication connection(s) 210 may include cellular network connection components, WiFi network connection components, Ethernet network connection components, Zigbee® network connection components, other radio frequency communication components, or the like. The communication connection(s) may facilitate communications using any conventional or proprietary communication protocols.

The memory 212 stores one or more applications, which are executable on the one or more processors 208. The application(s) may include, among other things, a data logging module 214 usable to log resource consumption data received from data collection devices 102. The data logging module 214 of the central office 202 may store resource consumption data received from the data collection device 102(1) in a data logging data repository 216. The resource consumption data may be stored in the data logging data repository 216 in raw (e.g., as a collection of NIMs/IDMs or as a record of consumption over time) or processed (e.g., validated, having missing values estimated, concatenated, compressed, etc.) forms. In some instances, the consumption data may be encrypted, in which case the data logging module 214 or another module or application of the central office 202 includes (or has access to) a decryption module including any algorithms, keys, or credentials needed to decrypt the data record.

Upon the occurrence of an event, the central office 202 is able to analyze the data logging data and compare resource consumption values during a first period of normal usage to consumption values during a second period of abnormal usage leading up to the event. Based on this analysis, the central office 202 is able to determine whether the utility providing the resource was responsible for the event (in this case a flood or water damage), and/or whether the resource consumption during the second period leading up to the event was sufficient to have caused the event.

Since the resource consumption records are stored in the data logging data repository 216 at the central office 202 in substantially real time, or at least at regularly scheduled intervals, the resource consumption data will be available for forensic interrogation even if the data collection device 102 does not survive the event. In that case, rather than sending the interrogation request (as in the example of FIG. 1), the central office 202 may read data, analyze, and determine responsibility for the event internally without sending an interrogation request to a data collection device 102. For example, the data logging module 214 of the central office 202 may obtain applicable records of resource consumption spanning an event (by interrogation command or otherwise) from the data logging data repository 216. The data logging module 214 or another system of the central office 202 may then analyze the resource consumption data and determine whether the utility providing the resource was responsible for the event, and/or whether the resource consumption during the second period leading up to the event was sufficient to have caused the event.

In addition to the forensic analysis of data logging data subsequent to an event, the networked environment 200 of this example is also capable of detecting abnormal periods of resource consumption and proactively notifying the utility or taking preventive action before occurrence of an event. To that end, the memory 212 also includes one or more event detection modules 218 configured to detect events or predict events prior to their occurrence based on resource consumption data, and alarming module 220 to alert relevant parties of the condition likely to cause the event.

For example, the event detection module(s) 218 may be configured to monitor and compare current consumption data with historical or "normal" consumption patterns to identify periods of abnormal consumption data. The normal consumption patterns are based on historical resource consumption through the particular meter, historical resource consumption by the customer currently associated with the particular meter, average resource consumption for other locations similarly situated to the location, average resource consumption by other customers similarly situated to the customer currently associated with the particular meter, a time of year, a current temperature, and/or a current occupancy status of the location.

In another example, determining that the current consumption rate at the location is an abnormal consumption of the resource at the location may comprise determining that the current consumption rate exceeds a predetermined threshold consumption rate for a predetermined threshold amount of time. The predetermined threshold may be a constant value or may vary based on, for example, a time of year, a current temperature, and/or a current occupancy status of the location. Thus, for example, a high water flow during the winter and/or at a location that is currently not occupied may trigger an alert, while similar flows during the summer or at a location that is currently occupied may not trigger an alert.

Upon detection of abnormal consumption data, the alarming module 220 may alert the utility, a customer, emergency services (e.g., police, fire department, and/or emergency medical services), and/or a third party of the abnormal consumption. The alert sent by the alarming module 220 may include, for example, details of the abnormal resource consumption (e.g., flow rate, difference of abnormal consumption vs. normal consumption, etc.) and a time at which the abnormal resource consumption began. The alert may be sent periodically or continuously. In the case of periodic alerts, the alerts are transmitted more frequently and/or with a higher importance than consumption data is otherwise transmitted by the data collection device 102 (e.g., more frequently or with higher importance than a NIM/IDM, or a record of consumption data over time).

Additionally or alternatively, the event detection module(s) 218 and/or the alarming module 220 may take one or more mitigating actions to mitigate or prevent occurrence of the event. Examples of mitigating actions may include, without limitation, turning off flow of the resource to the location, alerting occupants of the location and/or nearby locations, turning off power to the location (e.g., to avoid sparks in the case of a gas leak), or the like.

Furthermore, any of the actions described in this section as being performed by the central office 202 may additionally or alternatively be performed by the network computing device 206. In that case, the network computing device 206 may include or have access to one or more processors, memory, communication connections, a data logging module, a data logging data repository, event detection modules, and/or alarming modules, each of which may function similarly to the corresponding components of the central office 202. Therefore, description and illustration of these elements have been omitted for brevity.

Example Data Collection Device

Figure 3:
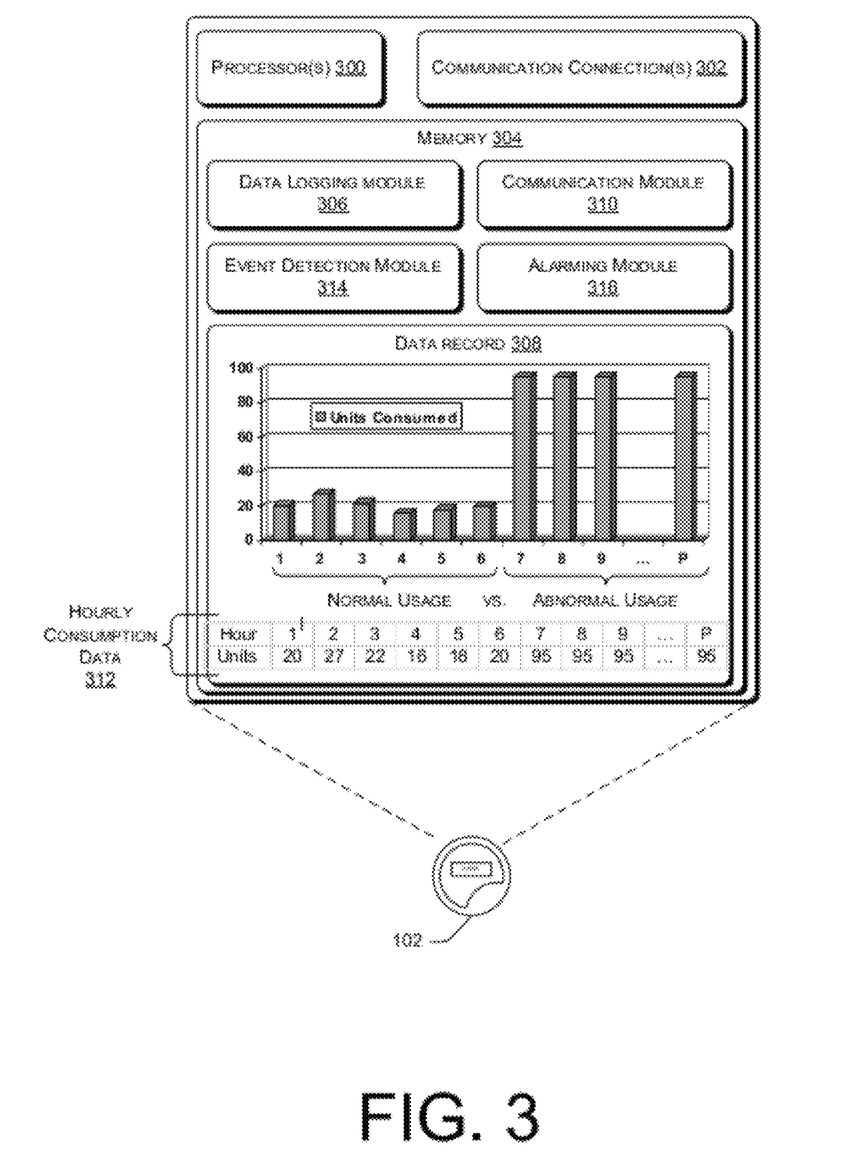
FIG. 3 is a block diagram showing an example data collection device having a data logging module capable of generating records of consumption data that can be analyzed to determine when, where (on which side of a utility meter), and/or why an event occurred.

FIG. 3 is a block diagram showing an example data collection device 102 capable of generating records of consumption data (i.e., data records) that can be analyzed to determine when, where (on which side of a utility meter), and/or why an event occurred. As shown in FIG. 3, the data collection device 102 includes one or more processors 300, communication connections 302, and memory 304. The communication connection(s) 302 allow the data collection device 102 to communicate with the computing device 106 (in the case of a non-networked environment) and/or the network computing device 206 or central office 202 (in the case of a networked environment) using wired and/or wireless network communication protocols. The communication connection(s) 302 may include, for example, wide area, local area, home area, and/or personal area network connections. For example, the communication connection(s) 302 may include cellular network connection components, WiFi network connection components, Ethernet network connection components, Zigbee® network connection components, other radio frequency communication components, or the like. The communication connection(s) may facilitate communications using any conventional or proprietary communication protocols.

The memory 304 stores one or more applications, which are executable on the one or more processors 300. The application(s) may include, among other things, a data logging module 306 usable to collect and store resource consumption data in a data record 308, and a communication module 310 to communicate the data record 308 to a requesting device. In some instances, the data record 308 may comprise a rolling record of resource consumption data for a predetermined period of time. For example, the data record 308 may include hourly consumption data 312 for a period of, for example, forty days. In that case, every hour a new consumption data point will be added and the oldest consumption data point will be deleted. However, in other embodiments, resource consumption data may be collected and stored for periods of time longer or shorter than forty days, and the frequency of sampling may be more or less often than hourly. As shown in FIG. 3, the data record 308 stores the hourly consumption data 312 in tabular form. The tabular data may additionally or alternatively be stored for presentation in graphical form (e.g., as a bar chart, line chart, etc.) showing the consumption data over time on a display in communication with the meter (e.g., a display of an in-home device, a display of a portable meter reading device, a display of a computer at the central office, or the like).

In the case of certain events, the consumption data may include a period of "normal" resource consumption and a period of "abnormal" resource consumption. As used herein, resource consumption is considered "normal" if, for example, it is consistent with a pattern or history of usage at the location or by the customer, it is within a flow range consistent with usage by other similarly situated locations or customers, and/or it does not otherwise fall within any predefined abnormal consumption patterns. In contrast, resource consumption is considered "abnormal" if it falls within one or more predefined abnormal consumption patterns. Examples of abnormal consumption patterns include, without limitation, consumption exceeding a predetermined amount/percentage over average historical levels for the location or customer, consumption exceeding a predetermined amount/percentage over average consumption for other similarly situated locations or customers, and consumption at or near a maximum flow through the respective meter. Determination of "abnormal" consumption may be determined based on any one or more of the foregoing or other conditions for a predetermined period of time. Thus, for example, maximum flow through a meter for a short period of time may not be considered abnormal, while maximum flow through the meter for a prolonged period of time (e.g., multiple hours) may be considered abnormal.

In the case of a non-networked environment, such as that shown in FIG. 1, in response to receipt of an interrogation request (e.g., from computing device 106), the communication module 310 of the data collection device 102 provides the requested data record 308 to the requesting device for analysis. In the case of a networked environment, such as that shown in FIG. 2, the communication module 310 of the data collection device 102 provides resource consumption data to the central office 202 via the network 204.

Alternatively, in some embodiments, the data collection device 102 may itself be able to perform some or all of the analysis of the resource consumption data and may provide the data to a user. In that case, the memory 304 may also include an event detection module 314 configured to detect events or predict events prior to their occurrence based on resource consumption data, and/or an alarming module 316 to alert relevant parties of the condition likely to cause the event. The event detection module 314 and the alarming module 316 may function similarly to the corresponding modules of the central office described above with respect to FIG. 2. Therefore, the functions of the event detection module 314 and the alarming module 316 have been omitted here for brevity. Also, in some instances, the data record 308 may be encrypted by the communication module 310 using any known encryption technique prior to transmission to the requesting device.

Computer Readable Media

Memory 112, 212, and 304 are examples of computer-readable media and may take the form of volatile memory, such as Random Access Memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media, such as modulated data signals and carrier waves.

Example Methods

Figure 4:
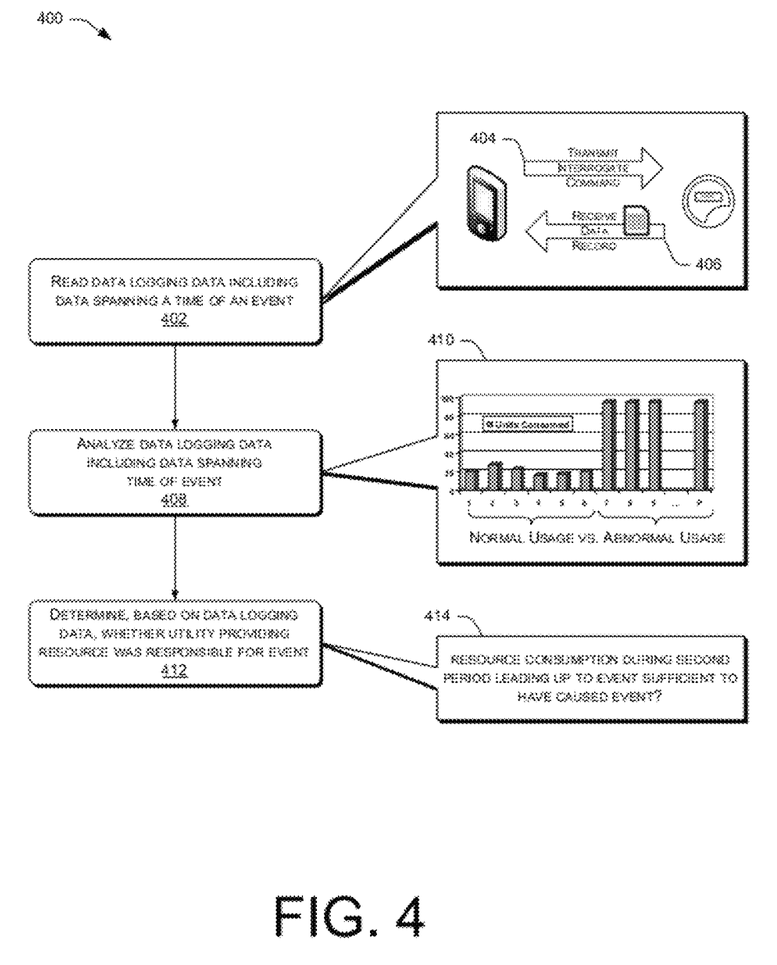
FIG. 4 is a flowchart illustrating an example method of reading data logging data to determine whether a utility supplying the resource is liable for an event.

FIG. 4 is a flowchart illustrating an example method 400 of reading data logging data following a gas explosion, water leak, or other event to determine whether a utility is at fault. Method 400 is described in the context of the example environments 100 and 200 of FIGS. 1 and 2 for ease of illustration, but is not limited to being performed in such environments. Rather, method 400 may be implemented in other environments and/or using other computing devices. Additionally, the example environments and computing devices described herein may be used to perform other methods.

At 402, a computing device, such as computing device 106, network computing device 206, or central office 202, reads data logging data spanning a time of an event. The data logging data may be read from a data collection device, such as data collection device 102 or, in the case of a networked environment, from a data logging data repository, such as data logging data repository 216. In still other examples, the computing device may be the data collection device itself. In one example, reading the data logging data spanning the time of the event includes, at 404, transmitting an interrogate command from the computing device to the data collection device and in response, at 406, receiving a data record including resource consumption data spanning the event from the data collection device.

At 408, the computing device analyzes the data logging data including data spanning the time of the event. Analyzing the data logging data may include, at 410, comparing resource consumption values during a first period of normal usage to consumption values during a second period of abnormal usage leading up to the event. In this example, as shown at 410, during the first six hours of the hourly consumption data usage levels hovered around 20 units/hour, which fell within a normal usage range based on historical data for the particular location, customer, and/or similarly situated location or customer. Beginning at the seventh hour, resource usage increased dramatically to 95 units/hour, where it stayed until the time of the event. The elevated consumption pattern in this example is considered abnormal usage relative to historical data for the particular location, customer, and/or similarly situated location or customer, at least for the prolonged period of usage at this higher rate.

At 412, the computing device determines, based on the data logging data in the data record, whether the utility providing the resource was responsible for the event. The determination may include, at 414 determining whether the resource consumption during the second, abnormal period leading up to the event was sufficient to have caused the event. For example, the computing device may determine whether a gas leak at a certain rate could have caused the force of explosion generated during the event, or whether the leak occurred prior to or after a fire began. The determination made at 412 may be definitive, or may be a preliminary determination subject to review and/or confirmation by an expert or law enforcement official.

Figure 5:
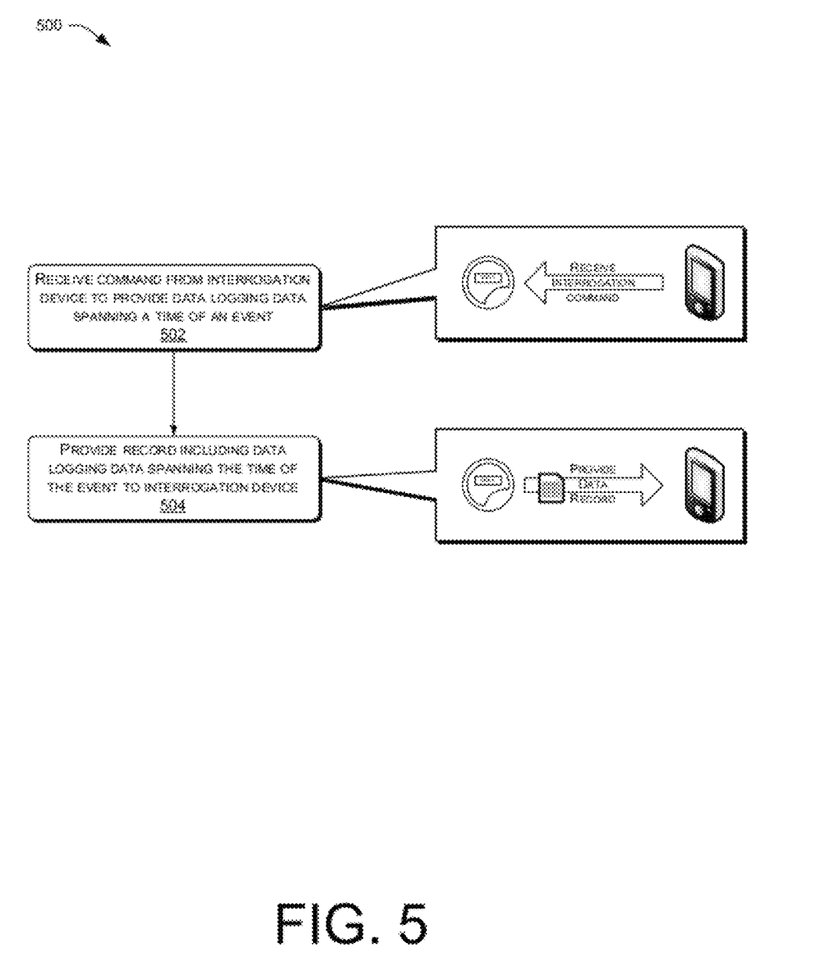
FIG. 5 is a flowchart illustrating an example method of providing a record of data logging data spanning a time of an event.

FIG. 5 is a flowchart illustrating an example method 500 of providing a record of data logging data spanning a time of an event. Method 500 may generally be thought of as a corollary to the method 400, providing the data requested in method 400. Method 500 is described in the context of the example environments 100 and 200 of FIGS. 1 and 2 for ease of illustration, but is not limited to being performed in such environments. Rather, method 500 may be implemented in other environments and/or using other computing devices. Additionally, the example environments and computing devices described herein may be used to perform other methods.

At 502, a data collection device, such as data collection device 102 receives an interrogation command from a computing device requesting consumption data for a time spanning an event. By way of example, the computing device from which the interrogation request is received may comprise computing device 106, network computing device 206, or central office 202. As noted above, the interrogation request may be for a default time period that happens to span the event, or the time period may be specified in the interrogation request so as to span the event.

At 504, the data collection device provides the record of consumption data (or data record) spanning the time of the event to the computing device that sent the interrogation request. As noted above, in some instances, the computing device sending the interrogation request and the data collection device may be one in the same. Such is the case when the central office 202 obtains the resource consumption data from the data logging data repository 216, or when the data collection device is configured to analyze the resource consumption data prior to provision to a requesting device.

Figure 6:
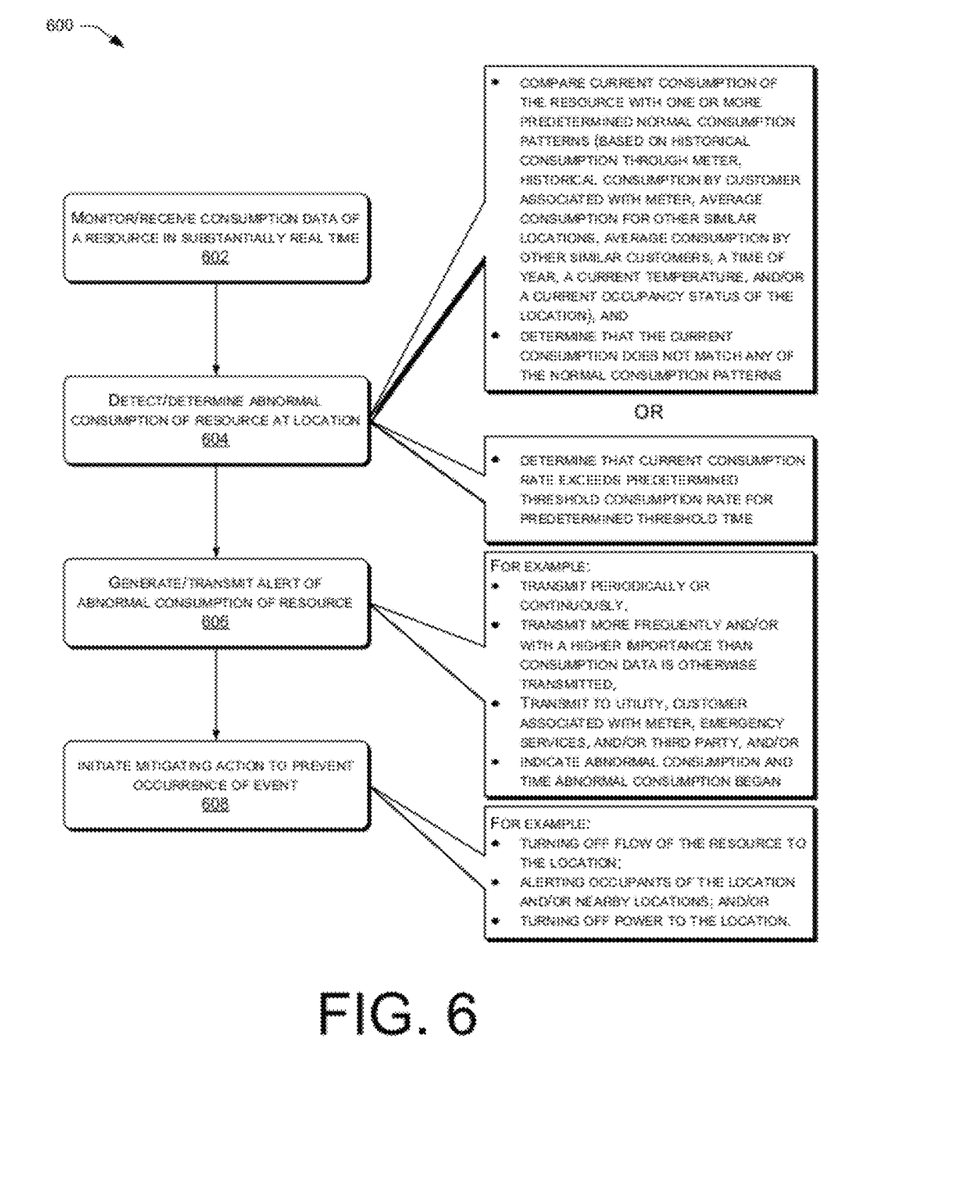
FIG. 6 is a flowchart illustrating an example method of alarming when resource consumption conditions indicate that an event is likely.

FIG. 6 is a flowchart illustrating an example method 600 of alarming when resource consumption conditions indicate that an event is likely. The method 600 may be implemented in various forms by a computing device at a central office, by a data collection device coupled to or integrated with a utility meter, and/or by a network communication device in communication with the data collection device over a network. Method 600 is described in the context of the example environment 200 of FIG. 2 for ease of illustration, but is not limited to being performed in such an environment. Rather, method 600 may be implemented in other environments and/or using other computing devices. Additionally, the example environments and computing devices described herein may be used to perform other methods.

At 602, consumption of a resource through a utility meter at a location is monitored or received in substantially real time. For example, a data collection device such as one of data collection devices 102 may directly monitor resource consumption through a meter to which the data collection device is coupled or integrated. The resource consumption data may then be sent from the data collection device and received by a network communication device such as network communication device 206 and/or a computing device of a central office such as central office 202. The resource consumption data may be received continuously, periodically at any suitable interval, such as those intervals listed in the discussion of FIG. 2 above.

At 604, abnormal consumption of the resource at the location may be detected or determined. For example, a data collection device 102 may detect abnormal consumption of the resource at the location. Additionally or alternatively, a network communication device 206 and/or a computing device of the central office 202 may determine based on received consumption data that a current consumption rate at the location is an abnormal consumption of the resource at the location. In one example, detecting/determining the abnormal consumption comprises comparing a current consumption of the resource through the utility meter with one or more predetermined normal consumption patterns, and determining that the current consumption does not match any of the normal consumption patterns. In that case, the normal consumption patterns may be based on historical resource consumption through the meter, historical resource consumption by a customer currently associated with the meter, average resource consumption for other locations similarly situated to the location, average resource consumption by other customers similarly situated to the customer currently associated with the meter, a time of year, a current temperature, and/or a current occupancy status of the location. In another example, detecting/determining the abnormal consumption may comprise determining that a current consumption rate exceeds a predetermined threshold consumption rate for a predetermined threshold amount of time. The predetermined threshold may be a constant value or may vary based on, for example, a time of year, a current temperature, and/or a current occupancy status of the location.

At 606, an alert may be generated and/or transmitted indicating the abnormal resource consumption. In various examples, the alert may be generated by a data collection device 102, a network computing device 206, or a computing device of central office 202. The alert may then be transmitted to one or more parties, such as a utility providing the resource, a customer associated with the meter, emergency services, or a third party. The alert may be generated and/or transmitted continuously or periodically. In the latter case, the alert may be generated or transmitted more frequently and/or with a higher importance than consumption data is otherwise generated or transmitted (e.g., more frequently than a NIM/IDM or record of consumption data over time). The alert may include, for example, an indication of the abnormal resource consumption and a time at which the abnormal resource consumption began.

In some examples, at 608, the method 600 further includes initiating a mitigating action to prevent an event based on the abnormal resource consumption. The mitigating event may include, for example, turning off flow of the resource to the location, alerting occupants of the location and/or nearby locations, and/or turning off power to the location.

Any of the acts of the example methods described herein may be performed in whole or in part by one or more processors executing computer-executable instructions stored on one or more computer-readable media. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer-readable media, including memory storage devices.

The example methods are illustrated as collections of blocks in logical flowcharts representing a sequence of operations that can be implemented in hardware, software, firmware, or a combination thereof. The order in which the blocks are described is not intended to be construed as a limitation, and any number of the described operations can be combined in any order to implement the method, or alternate methods. Additionally, individual operations may be omitted from the methods without departing from the spirit and scope of the subject matter described herein. In the context of software, the blocks represent computer instructions that, when executed by one or more processors, perform the recited operations.

CONCLUSION

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application. For example, while the non-networked environment 100 is used to illustrate an example of a natural gas explosion event and the networked environment 200 is used to illustrate an example of a flood or water leak event, these examples are merely illustrative and the illustrated environments may be used in connection with any sort of event involving supply of a resource to a location.

What is claimed is:

1. One or more computer-readable media storing instructions that, when executed by one or more processors of a data collection device, configure the one or more processors of the data collection device to perform acts comprising:
    monitoring a flow rate of natural gas through a utility meter at a location in substantially real time;
    detecting abnormal consumption of the natural gas at the location based on the flow rate through the utility meter by:
        determining that the flow rate of the natural gas exceeds a predetermined threshold consumption rate for a predetermined threshold amount of time, the predetermined threshold consumption rate varying over time, the predetermined threshold consumption rate including a first threshold consumption rate at a first time during the predetermined threshold amount of time and including a second threshold consumption rate at a second time during the predetermined threshold amount of time, at least one of the first threshold consumption rate or the second threshold consumption rate being based on at least one of a time of year, a current temperature, or an occupancy status; and
        comparing the flow of the natural gas with one or more predetermined normal consumption patterns, the one or more predetermined normal consumption patterns being based at least in part on:
            average natural gas consumption for other locations similarly situated to the location; or
            average natural gas consumption by other customers similarly situated to a customer currently associated with the utility meter;
    determining that an amount of abnormal consumption of the natural gas is sufficient to cause an explosion or fire;
    determining, based on the flow rate, that the abnormal consumption occurs on a customer side of the utility meter; and
    transmitting an alert indicating the abnormal consumption of the natural gas to a remote computing device.

2. The one or more computer-readable media of claim 1, wherein the one or more predetermined normal consumption patterns further being based at least in part on:
    historical natural gas consumption through the utility meter; and/or
    historical natural gas consumption by the customer currently associated with the utility meter.

3. The one or more computer-readable media of claim 1, wherein the alert is transmitted periodically or continuously.

4. The one or more computer-readable media of claim 1, wherein the alert is transmitted more frequently and/or with a higher importance than consumption data is otherwise transmitted by the data collection device.

5. The one or more computer-readable media of claim 1, wherein the alert indicates a time at which the abnormal consumption of the natural gas began.

6. The one or more computer-readable media of claim 1, wherein the acts further comprise initiating a mitigating action to prevent an event based on the abnormal consumption of the natural gas.

7. The one or more computer-readable media of claim 6, wherein the mitigating action comprises:
    turning off flow of the natural gas to the location;
    alerting occupants of the location and/or nearby locations; and/or
    turning off power to the location.

8. A method comprising:
    under control of a utility central office computing device located remotely to a utility meter, the central office computing device configured with computer-executable instructions:
    receiving, at the utility central office computing device, data logging data comprising flow rate data of natural gas, the data logging data originating from the utility meter at a location, the utility meter having at least a utility company side that is upstream of the meter and a consumer side that is downstream of the meter;
    based at least in part on the data logging data, determining that a current flow rate at the location corresponds to an abnormal consumption of the natural gas at the location by:
        determining that the current flow rate exceeds a predetermined threshold consumption rate for a predetermined threshold amount of time, the predetermined threshold consumption rate including a first threshold consumption rate at a first time during the predetermined threshold amount of time and including a second threshold consumption rate at a second time during the predetermined threshold amount of time, at least one of the first threshold consumption rate or the second threshold consumption rate being based on at least one of a time of year, a current temperature, or an occupancy status; and
        comparing the flow rate of the natural gas with one or more predetermined normal consumption patterns, the one or more predetermined normal consumption patterns being based at least in part on:
            average natural gas consumption for other locations similarly situated to the location; or
            average natural gas consumption by other customers similarly situated to a customer currently associated with the utility meter;
    determining, based on the flow rate, that the abnormal consumption is occurring on a customer side of the utility meter; and alerting a utility, a customer associated with the utility meter, emergency services, and/or a third party of the abnormal consumption of the natural gas.

9. The method of claim 8, wherein the one or more predetermined normal consumption patterns further being based at least in part on:
   historical natural gas consumption through the utility meter; and/or
   historical natural gas consumption by the customer currently associated with the utility meter.

10. The method of claim 8, further comprising initiating a mitigating action to prevent an event based on the abnormal consumption of the natural gas.

11. The method of claim 10, wherein the mitigating action comprises:
    turning off flow of the natural gas to the location;
    alerting occupants of the location and/or nearby locations; and/or
    turning off power to the location.

12. The method of claim 8, further comprising determining that an amount of the abnormal consumption of the natural gas is sufficient to cause an explosion or fire.

13. A computing device comprising:
    one or more processors;
    memory communicatively coupled to the one or more processors and storing executable instructions that, when executed by the one or more processors, cause the one or more processors to perform operations comprising:
    storing flow rate data of natural gas through a utility meter at a location, the utility meter having at least a utility company side that is upstream of the meter and a consumer side that is downstream of the meter;
    determining that a current flow rate at the location is an abnormal consumption of natural gas at the location by:
        determining that the current flow rate exceeds a predetermined threshold consumption rate for a predetermined threshold amount of time, the predetermined threshold consumption rate including a first threshold consumption rate at a first time during the predetermined threshold amount of time and including a second threshold consumption rate at a second time during the predetermined threshold amount of time; and
        comparing the flow rate of the natural gas with one or more predetermined normal consumption patterns, the one or more predetermined normal consumption patterns being based at least in part on:
            average natural gas consumption for other locations similarly situated to the location; or
            average natural gas consumption by other customers similarly situated to a customer currently associated with the utility meter;
    determining, based on the flow rate, that the abnormal consumption is occurring on a customer side of the utility meter; and
    alerting a utility, a customer associated with the utility meter, emergency services, and/or a third party of the abnormal consumption of the natural gas.

14. The computing device of claim 13, wherein the computing device comprises at least one of a server of a central office, a data collection device at the location, or a network computing device in communication with the utility meter.

15. The computing device of claim 13, wherein the operations further comprise determining that an amount of the abnormal consumption of the natural gas is sufficient to cause an explosion or fire.

* * * * *